United States Patent [19]
Hilpert

[11] Patent Number: 5,384,147
[45] Date of Patent: Jan. 24, 1995

[54] METHOD OF PROCESSING AVOCADO PULP

[75] Inventor: Clifford L. Hilpert, Vega, Tex.

[73] Assignee: INT Equipment Sales, Inc., Vega, Tex.

[21] Appl. No.: 138,383

[22] Filed: Oct. 20, 1993

Related U.S. Application Data

[63] Continuation of Ser. No. 745,833, Aug. 16, 1991, abandoned.

[51] Int. Cl.⁶ .................. B65B 31/02; A23B 7/148
[52] U.S. Cl. .................. 426/615; 426/404; 426/486; 426/397; 426/413
[58] Field of Search .......... 426/486, 615, 262, 270, 426/419, 404

[56] References Cited

U.S. PATENT DOCUMENTS

| | | | |
|---|---|---|---|
| Re. 14,489 | 6/1918 | Franks | 426/486 |
| 1,279,379 | 9/1918 | Sellars | 426/486 |
| 1,421,750 | 7/1922 | Willison . | |
| 1,557,358 | 10/1925 | Grab | 426/486 |
| 2,190,151 | 2/1940 | Hawkins | 426/486 |
| 2,647,838 | 8/1953 | Stone | 426/615 |
| 2,830,911 | 4/1958 | Fogelberg | 426/486 |
| 3,361,578 | 1/1968 | Hirtensteiner | 426/615 |
| 3,398,001 | 8/1968 | Benson | 426/615 |
| 3,399,999 | 9/1968 | Ellett . | |
| 3,535,127 | 10/1970 | Rahman et al. | 426/615 |
| 3,787,586 | 1/1974 | Hokanson et al. | 426/486 |
| 3,821,448 | 6/1974 | Parker et al. | 426/486 |
| 3,843,810 | 10/1974 | Fehmerling | 426/615 |
| 3,873,753 | 3/1975 | Nelson et al. | 426/615 |
| 3,900,571 | 8/1975 | Johnson . | |
| 4,008,336 | 2/1977 | Haendler et al. | 426/615 |
| 4,011,348 | 3/1977 | Farrier et al. | 426/615 |
| 4,014,153 | 3/1977 | Wilson . | |
| 4,143,167 | 3/1979 | Blanchaud et al. | 426/615 |
| 4,242,365 | 12/1980 | Numata et al. | 426/615 |
| 4,259,360 | 3/1981 | Venetucci et al. . | |
| 4,379,796 | 4/1983 | Gross . | |
| 4,504,513 | 3/1985 | Black | 426/486 |
| 4,629,629 | 12/1986 | David . | |
| 4,809,595 | 3/1989 | Catelli . | |
| 4,841,850 | 6/1989 | Friedmann . | |
| 4,865,861 | 9/1989 | Friedmann . | |
| 4,997,664 | 3/1991 | Williams . | |
| 5,000,972 | 3/1991 | Movaghar | 426/486 |

OTHER PUBLICATIONS

Technologia De Aumentos 1985, 20(5) 5, 7, 9-11 (English Abstract).
Investigacion Agricola 1983, 6(1) 33-38 (English Abstract).
Food Fundamentals, McWilliams, J. Wiley & Sons 1966 pp. 82,83.

*Primary Examiner*—Steven Weinstein
*Attorney, Agent, or Firm*—Dowell & Dowell

[57] ABSTRACT

A method of processing fresh avocados into pulp or guacamole wherein the mixed pulp is drawn into a chamber where the pulp is exposed to a high vacuum and thereafter the vacuum is slowly released. The product is subsequently packaged and a second, at least partial, vacuum is applied to the pulp within the packaging before the packaging is sealed.

4 Claims, 1 Drawing Sheet

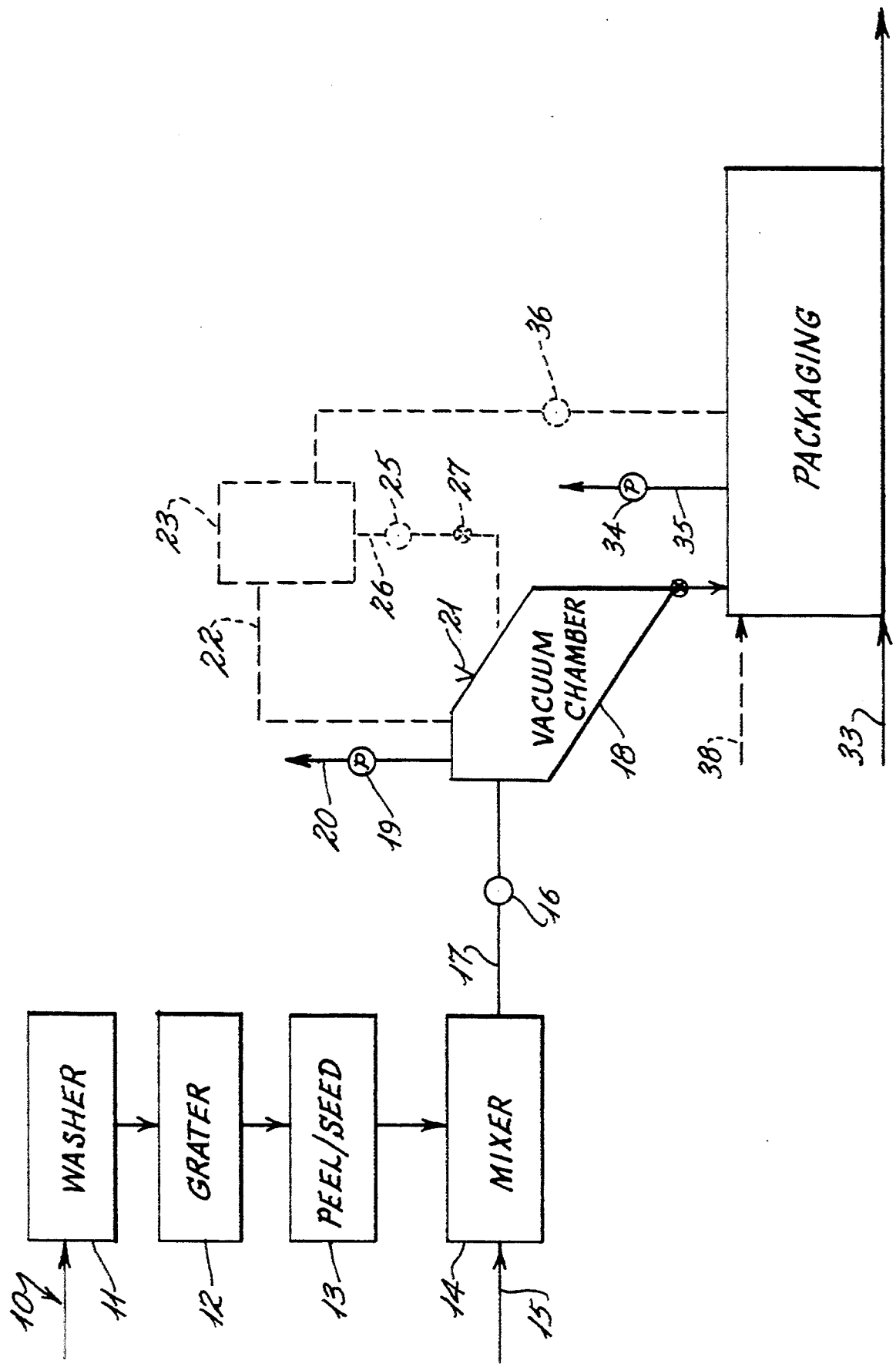

METHOD OF PROCESSING AVOCADO PULP

This application is a continuation, of application Ser. No. 07/745,833 filed Aug. 16, 1991.

BACKGROUND OF THE INVENTION

1. Field of the Invention

This invention is generally directed to a process for stabilizing the appearance of processed fruit fiber and, more specifically, to a process for processing avocado pulp or pulp which has been blended and seasoned into guacamole wherein the pulp or guacamole, prior to packaging, is drawn by vacuum into a chamber wherein the pulp is exposed to a very high vacuum having at least 99% efficiency to thereby remove oxygen from the fruit cells. The high vacuum is maintained on the product for periods of up to 1 minute and thereafter the vacuum is slowly released in order to insure that the chunkiness of the product is maintained. The product is thereafter discharged by gravity into containers after which a second vacuum is applied to the product within the packaging or the head space of the containers purged with steam and inert gas prior to the containers or packages being sealed.

2. History of the Related Art

Processing of fresh avocados into pulp or guacamole is conventionally done in a five step process wherein the fruit is initially washed and thereafter grated to remove culls. The fruit is subsequently peeled and the seed removed after which the pulp is mixed and packaged. Unfortunately, avocado pulp is highly unstable and brooms quickly when exposed to oxygen. The oxygen may be in the surrounding environment or oxygen released from the cells of the pulp as it is mixed. Conventional packaging techniques have relied on simply placing the product, once in a container or package, under vacuum to remove the air trapped in the head space of the container or package. Furthermore, the product is generally exposed to a low vacuum during the packaging process as the product expands and cannot be retained within the containers if too high a vacuum is applied.

Techniques of processing fruit and vegetable fiber by vacuum have been practiced in the fruit preparation art for a period of years. However, the prior art has not appreciated that an extremely high vacuum must be applied to pulp such as avocado pulp and thereafter the pressure slowly stabilized in order to preserve the chunkiness of the product while effectively removing substantially all oxygen from the product cells prior to the product being packaged. Further, the prior art does not recognize a second vacuum step wherein the product within the package or container is also exposed to a high vacuum to thereby insure that no oxygen remains within the container of the packaged product prior to its distribution.

In U.S. Pat. No. 1,421,750 to Willison, a process for treating vegetables in preparation for canning is disclosed wherein vegetables, including asparagus, beans, peas, spinach and the like, are first placed into a vacuum container after which lukewarm water is added. Thereafter, the container is subjected to a vacuum to release air bubbles from the vegetable matter with the air bubbles agitating the liquid and effectively removing mucous substances and impurities from the surface of the vegetables. After the vacuum has been applied the vacuum is "quickly" and "abruptly" broken and the unpurified water removed from the container. Fresh water is added and the sequence is repeated prior to the product being packaged. With this type of process the vegetable matter is placed within a body of water with the body of water being subjected to a vacuum only sufficient enough to cause a bubbling action to release some oxygen from the vegetable product. Further, the vacuum is "abruptly" or "quickly" released which, in the processing of an avocado pulp, would result in possible destruction of the texture of the resulting pulp product.

In U.S. Pat. No. 3,399,999 to Ellett, a process for de-aerating fruits and vegetables is disclosed wherein the product is first cut and thereafter discharged into a rotating vessel wherein the product is, in sequence, mixed with water and held under a partial vacuum until such time as the air within the pores of the slices has been reduced due to a pressure which approximates the partial pressure within the vessel after which the product is discharged through a column of water which is retained at the partial vacuum which, in the preferred embodiment, is described as being between 27 to 28 inches of mercury.

In U.S. Pat. No. 4,014,153 to Wilson, a process for displacing non-condensible gas from voids in food products utilizing fluid displacement techniques is disclosed. In this patent, a product containing non-condensible gases entrapped in voids between the product and in open areas of the product are first placed under vacuum and thereafter water is introduced into the container to displace any entrapped air in the voids in the product and between such products. After the water has been introduced, the air is removed by the vacuum system and the water bled from the degassing chamber.

In U.S. Pat. No. 4,841,850 to Friedmann, a process for treating fruit and vegetable products is disclosed wherein the product fiber is broken down into its smallest possible form by applying high pressure and then releasing the product into a low pressure area so that the elastic limit of the cell walls of the fruit and vegetable fiber is exceeded causing the walls to burst and release their cell contents. A similar process is disclosed in U.S. Pat. No. 4,865,861, also to Friedmann. It should be noted that in both processes the product is initially deaerated prior to being subjected to the high pressure treatment.

In U.S. Pat. No. 4,379,796 to Gross, a method of concentrating fresh fruit is disclosed wherein a mass of fruit is subjected to vacuum pressure sufficient to cause air and liquid in the cells of the fruit to pass through the walls of the cells while also applying temperature to the fruit which is below the boiling point of water at the vacuum pressure being maintained until a major portion of the air in the cells has passed through the walls thereof after which the de-aerated fruit is moved through a vacuum heater to cause liquid from the fruit to coat the surfaces thereof. During the process, the vacuum maintained is generally in the areas of 28.5 inches of mercury or 40.375 mm of pressure. U.S. Pat. No. 4,809,595 to Catelli discloses processing machinery for fruit and vegetable matters wherein the food product is continually processed under reduced atmospheric conditions.

In addition to simply reducing the amount of oxygen associated with processed food products, other prior art processes have incorporated a combination of reducing entrapped air and substituting inert gases such as nitrogen and carbon dioxide into the environment surrounding the processed food product to prevent further oxygenation of the product during its processing and packaging. Some examples of processes that use inert gas in the treatment of processed foods are disclosed in U.S. Pat. Nos. 3,900,571 to Johnson; 4,259,360 to Venetucci et al; and 4,997,664 to Williams.

SUMMARY OF THE INVENTION

This invention is directed to a method for processing fresh avocados into pulp or guacamole wherein after the fresh fruit has been washed, cut, and the seed removed, the pulp is mixed with spices and stabilizers are added as necessary to formulate the end-product. The mixed pulp is then drawn by vacuum into a chamber wherein the internal air within the product is removed. Once in the chamber a very high vacuum, approximating 99% absolute, is drawn on the product and retained for a period of up to a minute. Thereafter, the vacuum is reduced gradually at a rate not exceeding approximately 5% increase in pressure between the ambient and vacuum pressures per second in order to prevent the destruction of the chunkiness of the resultant product. In some instances, with fresher fruit it may be necessary to repeat the high vacuum process and slow pressure stabilization a second time. After the high vacuum treatment, the product is discharged by gravity into a canning or packaging station wherein the product, once contained, is again subjected to extremely high vacuum of approximately 99% efficiency so as to insure the removal of all air from within the container prior to sealing the container. In some instances, an inert gas such as nitrogen or carbon dioxide may be used to stabilize pressures in the vacuum chamber. Also, in the use of packaging which is not conducive to vacuum treatment, steam and an inert gas are used to purge the head space of the packaging prior to sealing the packages for shipment.

It is a primary object of the present invention to provide a process for treating avocado or guacamole in such a manner that substantially all air is removed from the cells of the fruit product and its surrounding environment during packaging without destroying the chunkiness of the product as it is processed to thereby obtain a resultant product which is natural in color and consistency and thus more appealing to the consumer.

BRIEF DESCRIPTION OF THE DRAWINGS

FIG. 1 is a schematic drawing showing in block diagram the process of the present invention.

DESCRIPTION OF THE PREFERRED EMBODIMENT

With continued reference to the drawings, the fresh avocado fruit is initially introduced by appropriate conveyor 10 into a washer 11 wherein the fruit is initially cleaned. Thereafter, the fruit is conveyed to a grater wherein the culls are removed from the fruit product in a manner known within the art and which is indicated at 12. After proper grating, the fruit is peeled and the seed removed also by conventional means as indicated in processing section 13. Once the fruit has been peeled and the seed removed the fiber is ready for crushing or mixing in a mixer 14 which is supplied. In the mixer, the fiber is broken down to its desired consistency for packaging and, if the product is to be distributed as a process guacamole, proper additives, flavorings, and stabilizers may be added to the product through line 15 or in a subsequent mixing step. Once the product is thoroughly mixed and ready for packaging, control valve 16 is opened in line 17 which extends from the mixer to a vacuum processing chamber 18. Once the valve 16 is open, a vacuum pump 19 is operated to draw air from the chamber 18 and to simultaneously pull the pulp product from the mixer 14 into the chamber 18. In this manner, the product is not adversely effected by further mechanical agitation which would occur if pumps or screw conveyors were used to move the product between the mixer and the chamber 18. This is beneficial in preserving the consistency of the end-product as determined within the mixer 14.

Once the product is fully contained within the chamber 18, valve 16 is closed and the pulp within the chamber 18 is exposed to a very high vacuum. The vacuum pump 19 is designed to provide 99% efficiency, therefore the pressure within the chamber will be reduced to between 0.15 and 0.14 psi and preferably 0.1469 psi. The vacuum is retained within the chamber for periods of up to a minute so that all oxygen within the fibers is effectively removed from the cells of the fiber and discharged through the outlet line 20. Upon completion of the vacuum step, the vacuum pump 19 is deactivated and bleed valve 21 is opened to allow a very slow stabilization of pressure within the tank and atmosphere. The introduction of air into the tank 18 should not exceed 5% of the total difference between the vacuum and the atmospheric pressure per second during the stabilization process. This again is important to insure that the product within the evacuation chamber 18 does not change its consistency and retains the chunkiness imparted to the product in the mixer 14. Any flash change in pressure would be detrimental to the end-product.

In some instances and especially where the avocado fruit fiber is extremely fresh, it may be necessary to repeat the above high vacuum process a second time before releasing the product from the vacuum processing chamber 18.

As opposed to allowing the pressure within the tank to be stabilized by atmospheric gases, in some instances it may be preferred, in order to insure complete preservation of the food product and its coloration, to allow the pressure to be normalized by introducing an inert gas such as nitrogen or carbon dioxide into the chamber 18 such as shown through line 22 leading from a source of inert gas supply 23. In these instances, care should be taken that the valve 24 through which the inert gas is introduced into the chamber 18 is regulated to insure that stabilization pressures are achieved at a rate not to exceed 5% per second of the difference between the vacuum pressure and ambient pressure. In this embodiment, as the pressure in the chamber 18 is brought back to atmospheric pressure, the only gas within the chamber will be the inert gas. To preserve the inert gas for recycling, a separate pump 25 is provided in a gas discharge line 26 having a one-way valve 27 to discharge the head space within the chamber 18 as product is supplied from the discharge end 30 thereof.

Once the fiber has been treated under high vacuum it is ready for packaging in packaging machine 32. The packaging machine 32 may either include containers or flexible packages which may be sealed in conventional manners. The vacuum chamber is shown as being mounted vertically above the packaging chamber so that the contents thereof may be discharged by gravity into containers passing through the packaging machine 32. Appropriate containers are conveyed on an incoming conveyor 33. Within the packaging machine 32, as the packages are filled, the packages are sealed from atmosphere and a second high pressure purging of the containers is achieved by operation of pump 34 withdrawing gas from the containers through line 35. The containers are maintained under high vacuum which, preferably, is a pressure similar to that applied in the vacuum chamber 18. It is possible to apply such vacuum in the packaging machine due to the previous vacuum applied to the product in the chamber 18 without fear of the contents exploding from the packaging.

In some instances, such as when plastic containers are utilized, it may not be possible to apply a high vacuum to the container during packaging. In those instances, after the product is introduced into the containers, steam 38 is injected into the head or air space after which an inert gas is applied to the head space within the container. In this manner, an inert source of nitrogen, such as from container 23, is directed through valve 36 and through appropriate injectors (not shown) into the head space of the containers or packages as they are sealed. The presence of a small amount of steam will create at least a partial or slight reduction of pressure within the containers being sealed. Such a process is not preferred, however, as it requires the expense of the nitrogen gas or other gas which is not necessary when sealing the containers under high vacuum as disclosed with regard to the preferred embodiment. Once the packages have been sealed, the product is ready for shipment.

With the process of the present invention it has been found that discoloration of the food product is substantially prevented thereby prolonging the shelf life of processed avocados and guacamole substantially over the shelf life obtainable by conventional processing procedures.

I claim:

1. A method of processing and packaging fresh avocados comprising the steps of:
   A) washing, peeling and seeding a fresh avocado;
   B) mixing the avocado to form a pulp having a predetermined chunky consistency;
   C) introducing the pulp into a vacuum chamber;
   D) applying a high vacuum to the pulp within the vacuum chamber, the high vacuum being approximately 99% absolute such that the pressure within the vacuum chamber is reduced to between approximately 0.14 and 0.15 psi and retaining the high vacuum for a period of up to approximately one minutes, sufficient to remove substantially all oxygen from the cells of the pulp;
   E) thereafter increasing the pressure within the vacuum chamber to substantially atmospheric pressure at a rate not to exceed 5% of the difference between the total vacuum pressure applied therein and atmospheric pressure per second, such that the rate preserves the chunky consistency of the pulp; and
   F) subsequently packaging the pulp from the vacuum chamber while applying at least a partial vacuum to the pulp within the packaging before the packaging is sealed.

2. The process of claim 1 wherein the vacuum within the packaging is drawn such that the pressure in the package is reduced to between 0.14 and 0.15 psi.

3. The process of claim 1 wherein said step of increasing the pressure within the vacuum chamber comprises introducing inert gas into the vacuum chamber.

4. The process of claim 1 wherein after said step of increasing the pressure within the vacuum chamber and before said step of packaging, said step of applying a high vacuum to said pulp and said step of increasing the pressure within the vacuum chamber are repeated sequentially.

* * * * *